US012598493B2

(12) United States Patent
Balasubramanian et al.

(10) Patent No.: US 12,598,493 B2
(45) Date of Patent: Apr. 7, 2026

(54) MEASUREMENT GAP CONFIGURATION FOR A NON-TERRESTRIAL NETWORK CELL

(71) Applicant: QUALCOMM Incorporated, San Diego, CA (US)

(72) Inventors: Anantharaman Balasubramanian, San Diego, CA (US); Shuanshuan Wu, San Diego, CA (US); Liangping Ma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 407 days.

(21) Appl. No.: 18/315,403

(22) Filed: May 10, 2023

(65) Prior Publication Data

US 2024/0381135 A1 Nov. 14, 2024

(51) Int. Cl.
H04W 24/08 (2009.01)
H04W 24/10 (2009.01)
H04W 84/06 (2009.01)

(52) U.S. Cl.
CPC ........... H04W 24/08 (2013.01); H04W 24/10 (2013.01); *H04W 84/06* (2013.01)

(58) Field of Classification Search
CPC ..... H04W 24/08; H04W 24/10; H04W 84/06; H04B 7/18513
See application file for complete search history.

(56) References Cited

U.S. PATENT DOCUMENTS

| | | | | |
|---|---|---|---|---|
| 2020/0189598 A1* | 6/2020 | Eigel | ..................... | B60W 10/20 |
| 2021/0377849 A1* | 12/2021 | Xu | ......................... | H04W 36/36 |
| 2023/0308958 A1* | 9/2023 | Dong | ................ | H04W 36/0058 |
| 2025/0016592 A1* | 1/2025 | Rune | .................. | H04B 7/18545 |
| 2025/0220628 A1* | 7/2025 | Khoshkholgh Dashtaki | ............... | |
| | | | | H04W 64/00 |

FOREIGN PATENT DOCUMENTS

| | | | | | |
|---|---|---|---|---|---|
| EP | 3917209 A1 | * | 12/2021 | ............ | H04W 36/36 |
| WO | 2022087577 | | 4/2022 | | |
| WO | 2022157735 A1 | | 7/2022 | | |
| WO | WO-2023231415 A1 | * | 12/2023 | ............ | H04W 24/08 |
| WO | WO-2024171114 A1 | * | 8/2024 | ......... | H04B 7/18547 |

OTHER PUBLICATIONS

International Search Report and Written Opinion—PCT/US2024/020081—ISA/EPO—Jul. 24, 2024.

* cited by examiner

*Primary Examiner* — Deepa Belur
(74) *Attorney, Agent, or Firm* — Harrity & Harrity, LLP

(57) ABSTRACT

Various aspects of the present disclosure generally relate to wireless communication. In some aspects, a user equipment (UE) may receive a non-terrestrial network (NTN) measurement gap configuration indicating an association of a location configuration with a gap configuration. The UE may selectively perform a measurement of an NTN cell according to the gap configuration based at least in part on a match of a location of the UE to a location indicated by the location configuration. Numerous other aspects are described.

28 Claims, 12 Drawing Sheets

500

506
Selectively perform NTN cell according to gap configuration based probability info during time interval 504
NTN measurement gap configuration (indicates probability info associated with NTN cell measurement during time interval)

502
NTN measurement gap configuration for UE 120

UE
120

Network node
110

100

400

402
NTN measurement gap
configuration for UE 120

Network
node
110

404
NTN measurement gap configuration
(indicates association of location
configuration with gap configuration)

UE
120

406
Selectively perform NTN cell
according to gap configuration based
at least in part on location match

500

502
NTN measurement gap
configuration for UE 120

Network
node
110

504
NTN measurement gap configuration
(indicates probability info associated
with NTN cell measurement during
time interval)

UE
120

506
Selectively perform NTN cell
according to gap configuration based
probability info during time interval Receive a non-terrestrial network (NTN) measurement gap configuration indicating an association of a location configuration with a gap configuration Selectively perform a measurement of an NTN cell according to the gap configuration based at least in part on a match of a location of the UE to a location indicated by the location configuration

610

620

600

700

710 Determine a non-terrestrial network (NTN) measurement gap configuration for a user equipment (UE), the NTN measurement gap configuration indicating an association of a location configuration with a gap configuration 720 Transmit the NTN measurement gap configuration for reception by the UE

800

810    Receive a non-terrestrial network (NTN) measurement gap configuration indicating probability information associated with measurement of an NTN cell during a time interval 820    Selectively perform a measurement of the NTN cell according to a gap configuration and based at least in part on the probability information during the time interval Determine a non-terrestrial network (NTN) measurement gap configuration for a user equipment (UE), the NTN measurement gap configuration indicating probability information associated with measurement of an NTN cell during a time interval

910

Transmit the NTN measurement gap configuration for reception by the UE

920

900

MEASUREMENT GAP CONFIGURATION FOR A NON-TERRESTRIAL NETWORK CELL

FIELD OF THE DISCLOSURE

Aspects of the present disclosure generally relate to wireless communication and to techniques and apparatuses for measurement gap configuration for a non-terrestrial network (NTN) cell.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving a non-terrestrial network (NTN) measurement gap configuration indicating an association of a location configuration with a gap configuration. The method may include selectively performing a measurement of an NTN cell according to the gap configuration based at least in part on a match of a location of the UE to a location indicated by the location configuration.

Some aspects described herein relate to a method of wireless communication performed by a network node. The method may include determining an NTN measurement gap configuration for a UE, the NTN measurement gap configuration indicating an association of a location configuration with a gap configuration. The method may include transmitting the NTN measurement gap configuration for reception by the UE.

Some aspects described herein relate to a method of wireless communication performed by a UE. The method may include receiving an NTN measurement gap configuration indicating probability information associated with measurement of an NTN cell during a time interval. The method may include selectively performing a measurement of the NTN cell according to a gap configuration and based at least in part on the probability information during the time interval.

Some aspects described herein relate to a method of wireless communication performed by a network node. The method may include determining an NTN measurement gap configuration for a UE, the NTN measurement gap configuration indicating probability information associated with measurement of an NTN cell during a time interval. The method may include transmitting the NTN measurement gap configuration for reception by the UE.

Some aspects described herein relate to a UE for wireless communication. The UE may include a memory and one or more processors coupled to the memory. The one or more processors may be configured to receive an NTN measurement gap configuration indicating an association of a location configuration with a gap configuration. The one or more processors may be configured to selectively perform a measurement of an NTN cell according to the gap configuration based at least in part on a match of a location of the UE to a location indicated by the location configuration.

Some aspects described herein relate to a network node for wireless communication. The network node may include a memory and one or more processors coupled to the memory. The one or more processors may be configured to determine an NTN measurement gap configuration for a UE, the NTN measurement gap configuration indicating an association of a location configuration with a gap configuration. The one or more processors may be configured to transmit the NTN measurement gap configuration for reception by the UE.

Some aspects described herein relate to a UE for wireless communication. The UE may include a memory and one or more processors coupled to the memory. The one or more processors may be configured to receive an NTN measurement gap configuration indicating probability information associated with measurement of an NTN cell during a time interval. The one or more processors may be configured to selectively perform a measurement of the NTN cell according to a gap configuration and based at least in part on the probability information during the time interval.

Some aspects described herein relate to a network node for wireless communication. The network node may include a memory and one or more processors coupled to the memory. The one or more processors may be configured to determine an NTN measurement gap configuration for a UE, the NTN measurement gap configuration indicating probability information associated with measurement of an NTN cell during a time interval. The one or more processors may be configured to transmit the NTN measurement gap configuration for reception by the UE.

Some aspects described herein relate to a non-transitory computer-readable medium that stores a set of instructions for wireless communication by a UE. The set of instructions, when executed by one or more processors of the UE, may cause the UE to receive an NTN measurement gap configuration indicating an association of a location configuration with a gap configuration. The set of instructions, when executed by one or more processors of the UE, may cause the UE to selectively perform a measurement of an NTN cell according to the gap configuration based at least in part on a match of a location of the UE to a location indicated by the location configuration.

Some aspects described herein relate to a non-transitory computer-readable medium that stores a set of instructions for wireless communication by a network node. The set of instructions, when executed by one or more processors of the network node, may cause the network node to determine an NTN measurement gap configuration for a UE, the NTN measurement gap configuration indicating an association of a location configuration with a gap configuration. The set of instructions, when executed by one or more processors of the network node, may cause the network node to transmit the NTN measurement gap configuration for reception by the UE.

Some aspects described herein relate to a non-transitory computer-readable medium that stores a set of instructions for wireless communication by a UE. The set of instructions, when executed by one or more processors of the UE, may cause the UE to receive an NTN measurement gap configuration indicating probability information associated with measurement of an NTN cell during a time interval. The set of instructions, when executed by one or more processors of the UE, may cause the UE to selectively perform a measurement of the NTN cell according to a gap configuration and based at least in part on the probability information during the time interval.

Some aspects described herein relate to a non-transitory computer-readable medium that stores a set of instructions for wireless communication by a network node. The set of instructions, when executed by one or more processors of the network node, may cause the network node to determine an NTN measurement gap configuration for a UE, the NTN measurement gap configuration indicating probability information associated with measurement of an NTN cell during a time interval. The set of instructions, when executed by one or more processors of the network node, may cause the network node to transmit the NTN measurement gap configuration for reception by the UE.

Some aspects described herein relate to an apparatus for wireless communication. The apparatus may include means for receiving an NTN measurement gap configuration indicating an association of a location configuration with a gap configuration. The apparatus may include means for selectively performing a measurement of an NTN cell according to the gap configuration based at least in part on a match of a location of the apparatus to a location indicated by the location configuration.

Some aspects described herein relate to an apparatus for wireless communication. The apparatus may include means for determining an NTN measurement gap configuration for a UE, the NTN measurement gap configuration indicating an association of a location configuration with a gap configuration. The apparatus may include means for transmitting the NTN measurement gap configuration for reception by the UE.

Some aspects described herein relate to an apparatus for wireless communication. The apparatus may include means for receiving an NTN measurement gap configuration indicating probability information associated with measurement of an NTN cell during a time interval. The apparatus may include means for selectively performing a measurement of the NTN cell according to a gap configuration and based at least in part on the probability information during the time interval.

Some aspects described herein relate to an apparatus for wireless communication. The apparatus may include means for determining an NTN measurement gap configuration for a UE, the NTN measurement gap configuration indicating probability information associated with measurement of an NTN cell during a time interval. The apparatus may include means for transmitting the NTN measurement gap configuration for reception by the UE.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
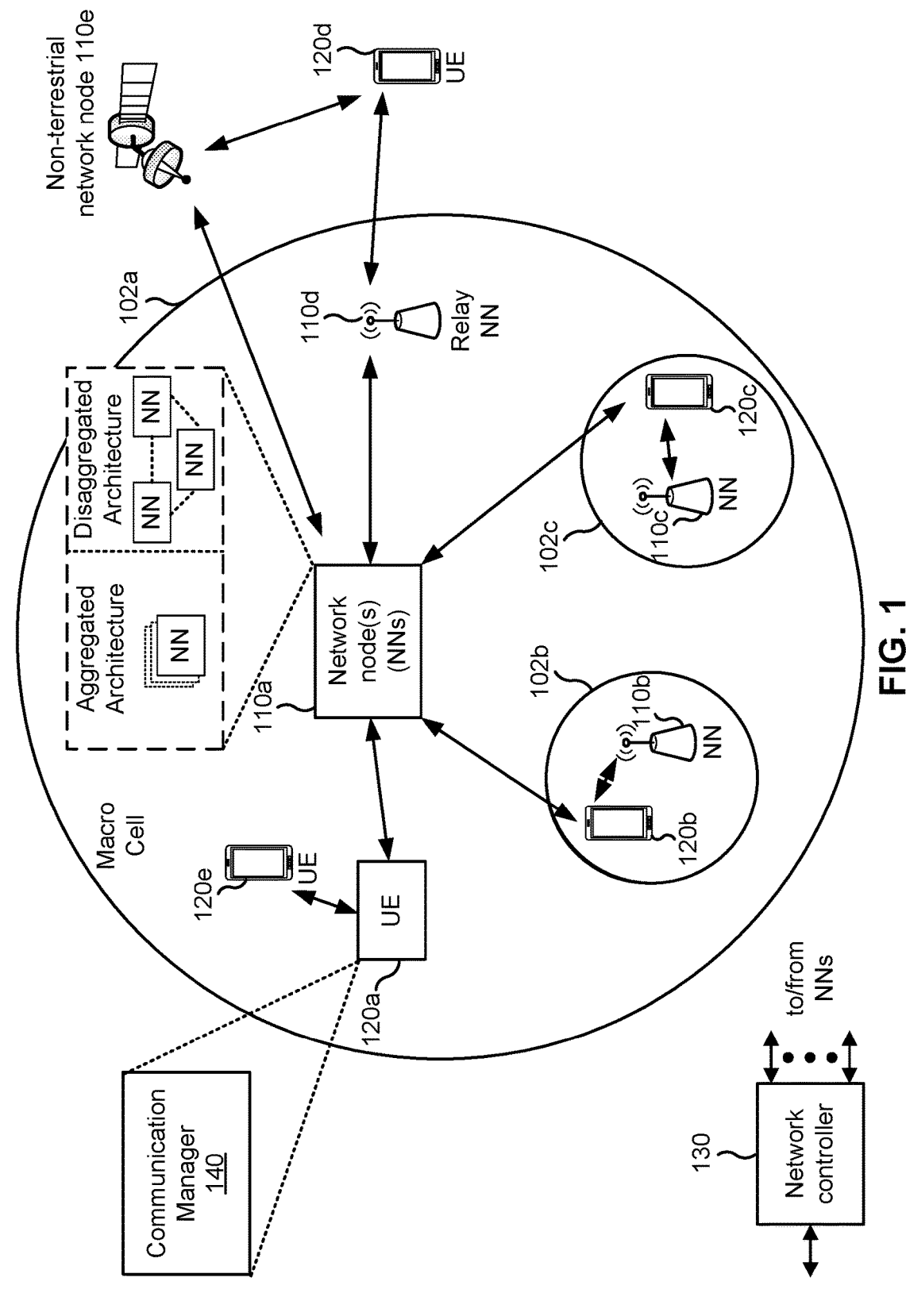
FIG. 1 is a diagram illustrating an example of a wireless network, in accordance with the present disclosure.

A user equipment (UE) may be configured with a measurement gap that causes communication in a current serving cell to be suspended and to allow the UE to perform a measurement of, for example, an intra-frequency cell, an inter-frequency cell, or an inter-radio-access-technology (RAT) cell. Regardless of the scenario in which a measurement gap is used and the configuration of the measurement gap itself, the use of measurement gaps impacts performance of the UE. For example, because a measurement gap interrupts both uplink communication and downlink communication of the UE, a throughput achieved by the UE is reduced. In a typical mode of operation, a UE is configured with measurement gaps to cause the UE to perform measurements of both non-terrestrial network (NTN) cells and terrestrial network (TN) cells. However, in some scenarios, measurement of an NTN cell may not be necessary. For example, if coverage provided by one or more cells of a TN is sufficient to provide acceptable coverage for the UE, then measurement of one or more NTN cells may not be needed (e.g., measurement of TN cells only may be sufficient) and, in fact, would negatively impact performance of the UE.

Some aspects described herein provide techniques and apparatuses for measurement gap configuration for an NTN cell. In some aspects, a UE may receive an NTN measurement gap configuration. In some aspects, the measurement gap configuration may indicate an association of a location configuration with a gap configuration. Here, the UE may selectively perform a measurement of an NTN cell according to the gap configuration based at least in part on a match of a location of the UE to a location indicated by the location configuration. Additionally, or alternatively, the NTN measurement gap configuration may indicate probability information associated with measurement of an NTN cell during a time interval. Here, the UE 120 may selectively perform a measurement of the NTN cell according to a gap configuration and based at least in part on the probability information during the time interval. In general, the techniques and apparatuses described herein enable configuration of a measurement gap for an NTN cell based on a location or heading of the UE and TN coverage information.

In some aspects, the techniques and apparatuses described herein enable measurement gap configuration that serves to reduce a number of NTN cell measurements performed by the UE. As a result, interruption to both uplink communication and downlink communication of the UE is reduced, thereby improving performance of the UE (e.g., by increasing throughput, by reducing communication latency, or the like).

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a UE 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, an unmanned aerial vehicle, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHZ-7.125 GHZ) and FR2 (24.25 GHZ-52.6 GHz). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHZ. For example, three higher operating bands have been identified as frequency range designations FR4a or FR4-1 (52.6 GHZ.-71 GHZ), FR4 (52.6 GHZ-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a. FR4-1, and/or FR5) may be modified, and techniques described herein are applicable to those modified frequency ranges.

In some aspects, the wireless network 100 may include one or more non-terrestrial network (NTN) deployments in which a non-terrestrial wireless communication device may include a network node 110. Such a network node 110 is sometimes referred to as a non-terrestrial network node 110 (e.g., network node 110e in FIG. 1). As used herein, an NTN may refer to a network for which access is facilitated by one or more non-terrestrial network nodes 110 and/or one or more other types of a non-terrestrial wireless communication devices, such as one or more non-terrestrial relay stations.

In some aspects, the wireless network 100 may include any number of non-terrestrial wireless communication devices. A non-terrestrial wireless communication device may include, for example, a satellite or a high-altitude platform (HAP). A HAP may include a balloon, a dirigible, an airplane, and/or an unmanned aerial vehicle. A non-terrestrial wireless communication device may be part of an NTN that is separate from the wireless network 100. Alternatively, an NTN may be part of the wireless network 100. In some aspects, satellites may communicate directly and/or indirectly with other entities in wireless network 100 using satellite communication. The other entities may include UEs (e.g., UEs 120), other satellites in the one or more NTN deployments (e.g., other network nodes 110), other types of network nodes (e.g., stationary or ground-based network nodes), relay stations, and/or one or more components and/or devices included in a core network of wireless network 100.

In some aspects, the UE 120 may include a communication manager 140. As described in more detail elsewhere herein, the communication manager 140 may receive an NTN measurement gap configuration indicating an association of a location configuration with a gap configuration; and selectively perform a measurement of an NTN cell according to the gap configuration based at least in part on a match of a location of the UE 120 to a location indicated by the location configuration. Additionally, or alternatively, the communication manager 140 may receive an NTN measurement gap configuration indicating probability information associated with measurement of an NTN cell during a time interval; and selectively perform a measurement of the NTN cell according to a gap configuration and based at least in part on the probability information during the time interval. Additionally, or alternatively, the communication manager 140 may perform one or more other operations described herein.

In some aspects, the network node 110 may include a communication manager 150. As described in more detail elsewhere herein, the communication manager 150 may determine an NTN measurement gap configuration for a UE 120, the NTN measurement gap configuration indicating an association of a location configuration with a gap configuration; and transmit the NTN measurement gap configuration for reception by the UE 120. Additionally, or alternatively, the communication manager 150 may determine an NTN measurement gap configuration for a UE 120, the NTN measurement gap configuration indicating probability information associated with measurement of an NTN cell during a time interval; and transmit the NTN measurement gap configuration for reception by the UE 120. Additionally, or alternatively, the communication manager 150 may perform one or more other operations described herein.

As indicated above, FIG. 1 is provided as an example. Other examples may differ from what is described with regard to FIG. 1.

Figure 2:
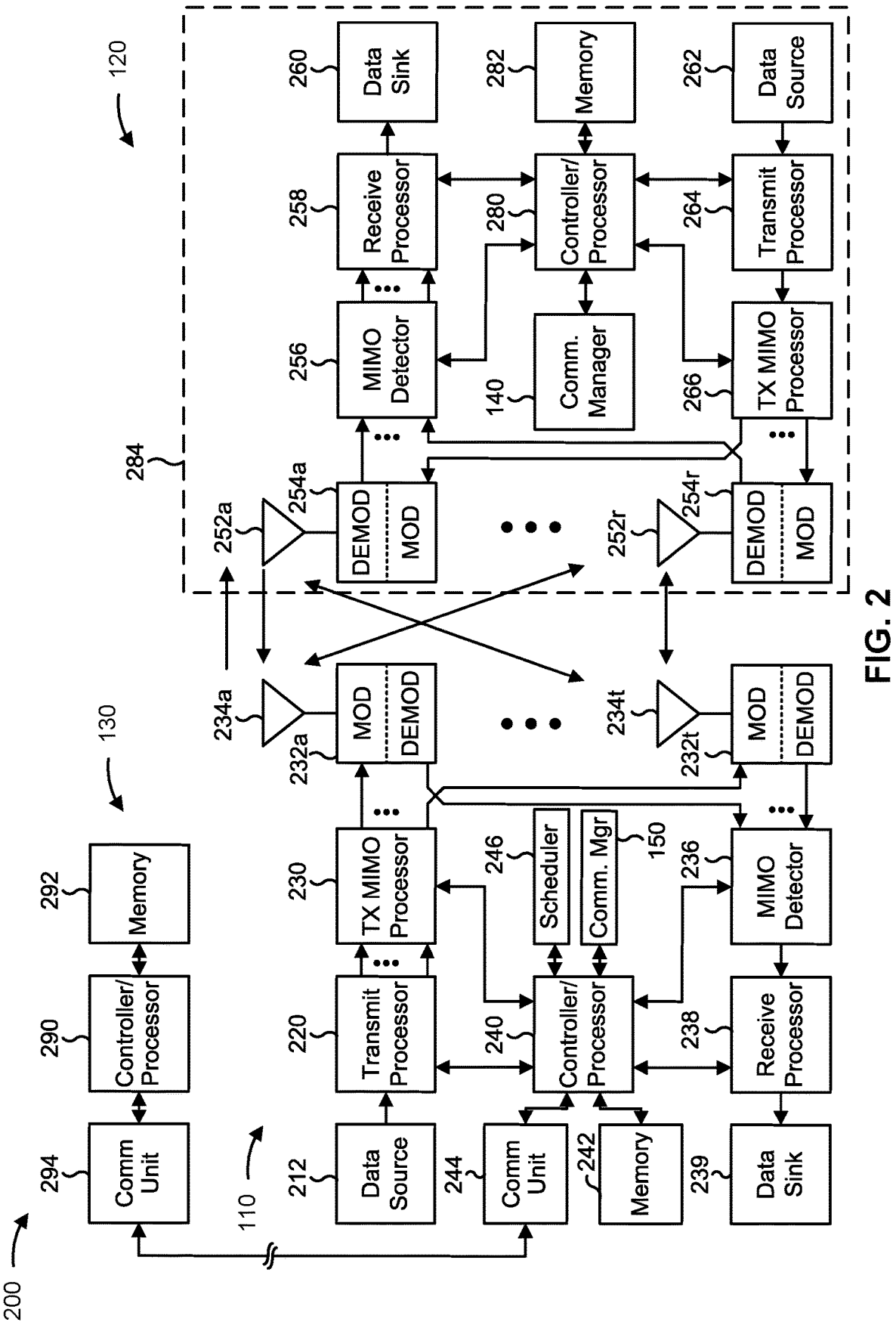
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4A-11).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4A-11).

The controller/processor 240 of the network node 110, the controller/processor 280 of the UE 120, and/or any other component(s) of FIG. 2 may perform one or more techniques associated with measurement gap configuration for an NTN cell, as described in more detail elsewhere herein. For example, the controller/processor 240 of the network node 110, the controller/processor 280 of the UE 120, and/or any other component(s) of FIG. 2 may perform or direct operations of, for example, process 600 of FIG. 6, process 700 of FIG. 7, process 800 of FIG. 8, process 900 of FIG. 9, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 600 of FIG. 6, process 700 of FIG. 7, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, the UE 120 includes means for receiving an NTN measurement gap configuration indicating an association of a location configuration with a gap configuration; and/or means for selectively performing a measurement of an NTN cell according to the gap configuration based at least in part on a match of a location of the UE 120 to a location indicated by the location configuration. Additionally, or alternatively, the UE 120 includes means for receiving an NTN measurement gap configuration indicating probability information associated with measurement of an NTN cell during a time interval; and/or means for selectively performing a measurement of the NTN cell according to a gap configuration and based at least in part on the probability information during the time interval. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 110 includes means for determining an NTN measurement gap configuration for a UE 120, the NTN measurement gap configuration indicating an association of a location configuration with a gap configuration; and/or means for transmitting the NTN measurement gap configuration for reception by the UE 120. Additionally, or alternatively, the network node 110 includes means for determining an NTN measurement gap configuration for a UE 120, the NTN measurement gap configuration indicating probability information associated with measurement of an NTN cell during a time interval; and/or means for transmitting the NTN measurement gap configuration for reception by the UE 120. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
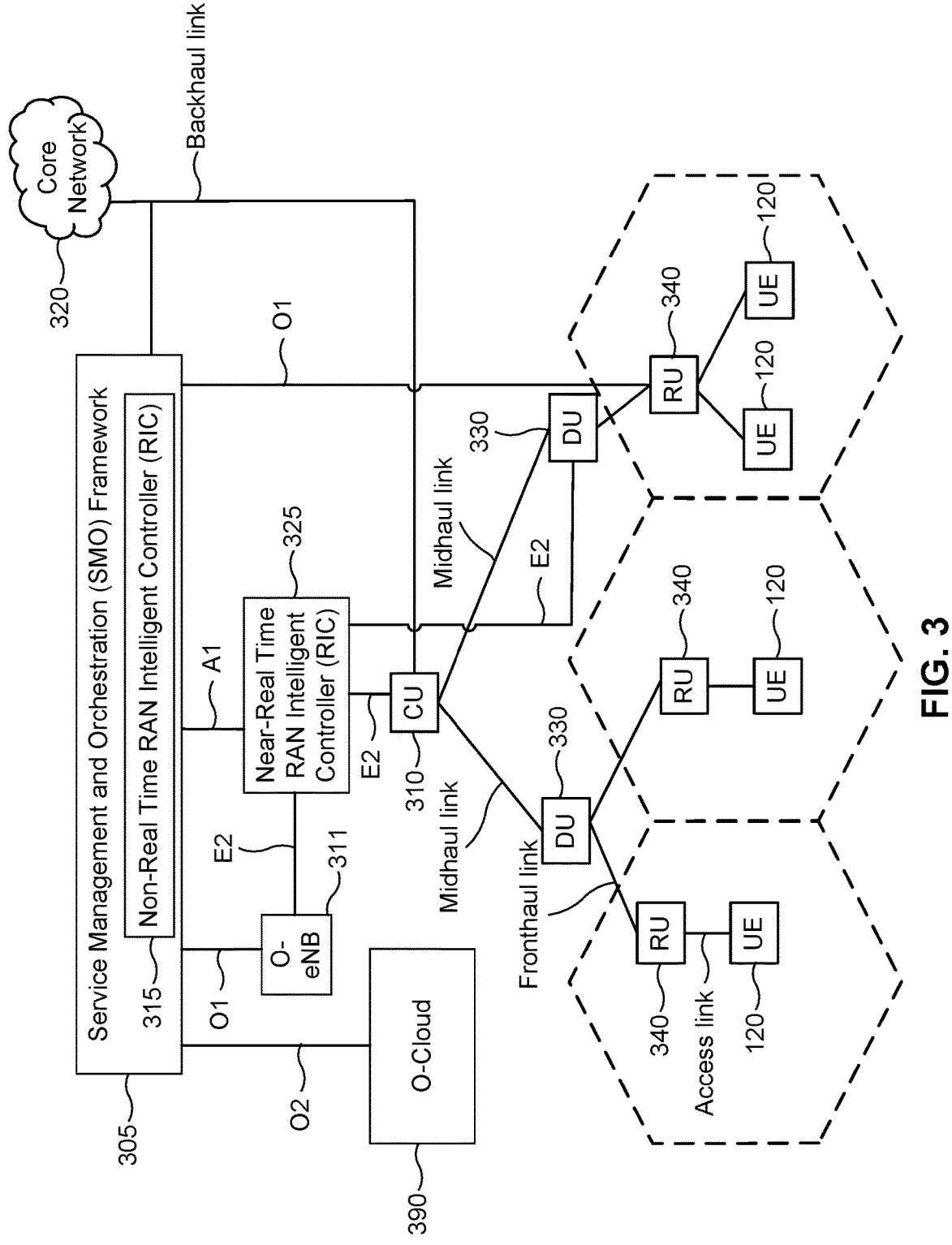
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUS 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (IFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

A non-terrestrial network node (e.g., a satellite) may use multiple antennas to form multiple beams. In practice, the multiple beams can operate in different frequency intervals (e.g., different bandwidth parts (BWPs)) in order to, for example, mitigate interference among the multiple beams. In one example configuration, the multiple beams formed by the non-terrestrial network node can be configured as a single cell. In another example configuration, the multiple beams formed by the non-terrestrial network node can be configured as a group of cells (e.g., where each cell is associated with at least one beam of the multiple beams).

Additionally, a UE may in some scenarios need to perform a measurement that cannot be completed while the UE is tuned to the current serving cell. To accommodate such a scenario, the UE can be configured with a measurement gap. A measurement gap is a period of time during which downlink communication and uplink communication are suspended in the current serving cell to allow the UE to perform a measurement of, for example, an intra-frequency cell (e.g., a cell operating outside an active BWP), an inter-frequency cell, or an inter-RAT cell. With respect to an inter-frequency cell measurement or an inter-RAT cell measurement, a measurement gap should be configured so as to provide the UE with sufficient time to re-tune a transceiver to a target carrier, perform a set of measurements, and re-tune the transceiver back to the original carrier. Notably, a given re-tuning operation in this scenario may take up to approximately 0.5 milliseconds (ms). With respect to an intra-frequency cell measurement, in one example, a UE may be configured to utilize analog beamforming (e.g., within Frequency Range 2 (FR2)), and so a measurement gap may be configured so as to provide the UE sufficient time to redirect a beam from the serving cell to a neighboring cell, perform a set of measurements on the neighboring cell, and redirect the beam back from the neighboring cell to the serving cell. As another example with respect to intra-frequency cell measurement, the UE may be configured with an active BWP that does not include an intra-frequency synchronization signal (SS)/physical broadcast channel (PBCH) block, and a measurement gap should be configured so as to provide the UE with sufficient time to re-tune a transceiver to receive the intra-frequency SS/PBCH block, perform a set of measurements, and re-tune the transceiver back to the original frequency.

In some systems, such as an NR system, measurement gap lengths of 1.5 ms, 3 ms, 3.5 ms, 4 ms, 5.5 ms, and 6 ms with repetition periodicities of 20 ms, 40 ms, 80 ms, and 160 ms are defined. Further, there are conventionally three different types of measurement gap configurations in an NR system: (1) a measurement gap applicable to UEs operating in Frequency Range 1 (FR1) (e.g., gapFR1), (2) a measurement gap applicable to UEs operating in FR2 (e.g., gapFR2), and (3) a measurement gap applicable to all frequencies (e.g., gapUE).

Regardless of the scenario in which a measurement gap is used and the configuration of the measurement gap itself, the use of measurement gaps impacts performance of the UE. For example, because a measurement gap interrupts both uplink communication and downlink communication of the UE, a throughput achieved by the UE is reduced. It follows that more frequent and longer measurement gaps increase the detrimental impact on achievable throughput of the UE.

In a typical mode of operation, a UE is configured with measurement gaps to cause the UE to perform measurements of both NTN cells and terrestrial network (TN) cells. However, in some scenarios, measurement of an NTN cell may not be necessary. For example, if coverage provided by one or more cells of a TN is sufficient to provide acceptable coverage for the UE, then measurement of one or more NTN cells may not be needed (e.g., measurement of TN cells only may be sufficient) and, in fact, would negatively impact performance of the UE. For example, measurement of an NTN cell in a location of adequate TN coverage reduces throughput of the UE due to the frequency of measurement of the NTN cell and comparatively longer measurement gap length required for measurement of the NTN cell.

Some aspects described herein provide techniques and apparatuses for measurement gap configuration for an NTN cell. In some aspects, a UE may receive an NTN measurement gap configuration. In some aspects, the measurement gap configuration may indicate an association of a location configuration with a gap configuration. Here, the UE may selectively perform a measurement of an NTN cell according to the gap configuration based at least in part on a match of a location of the UE to a location indicated by the location configuration. Additionally, or alternatively, the NTN measurement gap configuration may indicate probability information associated with measurement of an NTN cell during a time interval. Here, the UE 120 may selectively perform a measurement of the NTN cell according to a gap configuration and based at least in part on the probability information during the time interval. In general, the techniques and apparatuses described herein enable configuration of a measurement gap for an NTN cell based on a location or heading of the UE 120 and TN coverage information. In some aspects, the techniques and apparatuses described herein enable measurement gap configuration that serves to reduce a number of NTN cell measurements performed by the UE. As a result, interruption to both uplink communication and downlink communication of the UE is reduced, thereby improving performance of the UE (e.g., by increasing throughput, by reducing communication latency, or the like). Additional details are provided below.

Figure 4A:
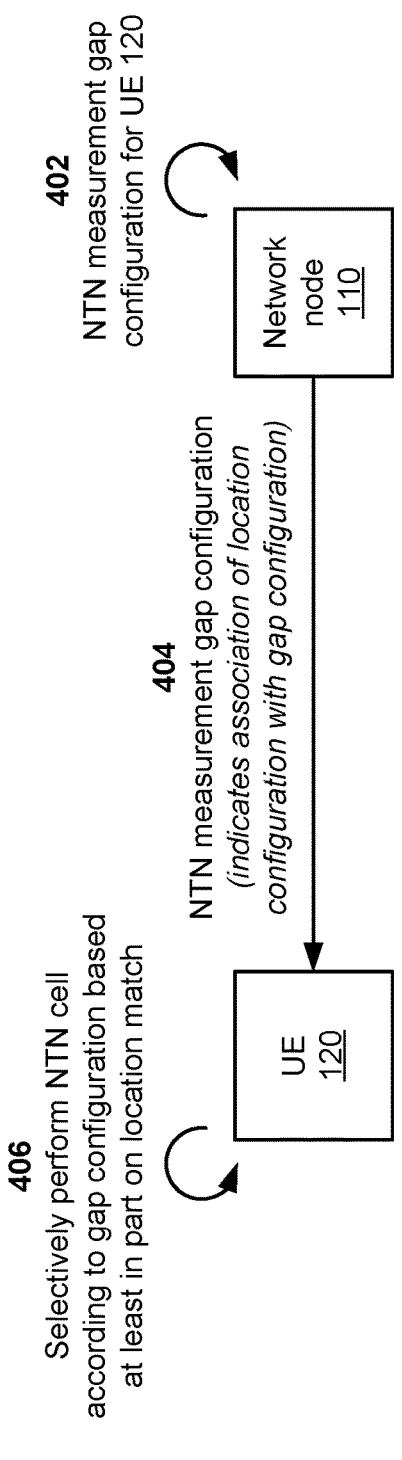
FIGS. 4A and 4B are diagrams illustrating an example associated with measurement gap configuration of a non-terrestrial network (NTN) cell, in accordance with the present disclosure.
Figure 4B:
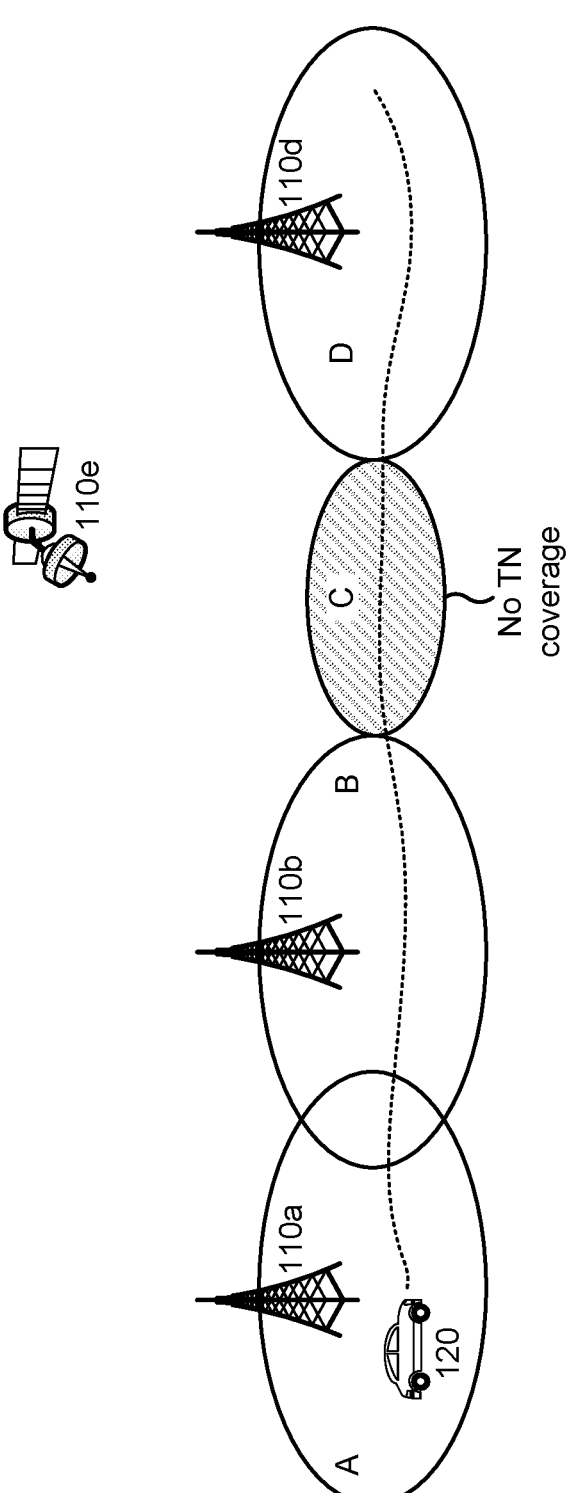

FIGS. 4A and 4B are diagrams illustrating an example 400 associated with measurement gap configuration of an NTN cell, in accordance with the present disclosure. As shown in FIG. 4A, the example 400 includes communication between UE 120 and a network node 110 (e.g., a terrestrial network node 110 or a non-terrestrial network node 110). In some aspects, the UE 120 and the network node 110 may be included in a wireless network, such as wireless network 100. The UE 120 and the network node 110 may communicate via a wireless access link, which may include an uplink and a downlink.

As shown at reference 402, the network node 110 may determine an NTN measurement gap configuration for the UE 120. The NTN measurement gap configuration is a configuration based at least in part on which the UE 120 selectively performs a measurement of an NTN cell. In some aspects, the NTN measurement gap configuration associates a location configuration with a gap configuration.

The location configuration is a configuration that indicates a location associated with the performance of measurements of one or more NTN cells. In some aspects, the location configuration indicates a location at which the UE 120 is to perform a measurement of an NTN cell. Alternatively, the location configuration may in some aspects indicate a location at which the UE 120 is to refrain from performing a measurement of an NTN cell.

As one example, the location may be indicated in the location configuration by a latitude range and a longitude range (e.g., a global positioning system (GPS) latitude range and a GPS longitude range) that define a geographic area. In some aspects, the latitude and longitude ranges may define a geographic area in which the UE 120 is to perform measurements of NTN cells. Alternatively, the latitude and longitude ranges may in some aspects define a geographic area in which the UE 120 is to refrain from performing measurements of NTN cells. In such an aspect, the UE 120 may be configured to perform measurements of NTN cells while the UE 120 is outside of the geographic area.

As another example, the location may be indicated in the location configuration by a TN cell identity (e.g., a cell identifier of a TN cell), a heading (e.g., a direction), and a heading deviation threshold. In some aspects, the TN cell identity, the heading, and the heading deviation threshold may indicate that the UE 120 is to perform measurements of NTN cells if the UE 120 is attached to a TN cell indicated by the TN cell identity and is moving in a direction indicated by the heading with a deviation that is within the heading deviation threshold. Alternatively, the TN cell identity, the heading, and the heading deviation threshold may in some aspects indicate that the UE 120 is to refrain from performing measurements of NTN cells if the UE 120 is attached to a TN cell indicated by the TN cell identity and is moving in a direction indicated by the heading with a deviation that is within the heading deviation threshold. In such an aspect, the UE 120 may be configured to perform measurements of NTN cells while in other circumstances (e.g., while attached to another TN cell, while attached to the TN cell and moving in another direction, while attached to the TN cell and moving in the direction but with a deviation that is greater than the heading deviation threshold, or the like).

As another example, the location may be indicated in the location configuration by a zone identifier. For example, the network node 110 may (at an earlier time) transmit, and the UE 120 may receive, a zone configuration that indicates one or more zones. Here, the zone configuration may define each zone by a geographic area (e.g., using a set of GPS coordinates) indicated in the zone configuration and may associate each zone with a zone identifier. In this example, the location configuration may indicate the zone identifier, which enables the UE 120 to identify the location (e.g., using the zone configuration). In some aspects, the one or more zones may be preconfigured on the UE 120, which may reduce overhead associated with the NTN measurement gap configuration. In some aspects, the zone identifier may indicate a zone in which the UE 120 is to perform measurements of NTN cells. Alternatively, the zone identifier may in some aspects indicate a zone in which the UE 120 is to refrain from performing measurements of NTN cells. In such an aspect, the UE 120 may be configured to perform measurements of NTN cells while the UE 120 is outside of the indicated zone.

In some aspects, the network node 110 may transmit, and the UE 120 may receive, the location configuration. In some aspects, the location configuration may be transmitted separately from the NTN measurement gap configuration (e.g., prior to the NTN measurement gap configuration being transmitted by the network node 110). Alternatively, the location configuration may in some aspects be transmitted with the NTN measurement gap configuration. In some aspects, the location configuration may be transmitted via RRC signaling or another higher layer protocol. In some aspects, the network node 110 may transmit, and the UE 120 may receive, multiple location configurations, each indicating a different location.

The gap configuration is a configuration indicating one or more characteristics of a measurement gap. For example, the gap configuration may indicate a measurement gap offset (e.g., gapOffset), a measurement gap length (e.g., mgl), a measurement gap repetition period (e.g., mgrp), a measurement gap timing advance (e.g., mgta), or the like.

In some aspects, the network node 110 may transmit, and the UE 120 may receive, the gap configuration. In some aspects, the gap configuration may be transmitted separately from the NTN measurement gap configuration (e.g., prior to the NTN measurement gap configuration being transmitted by the network node 110). Alternatively, the gap configuration may in some aspects be transmitted with the NTN measurement gap configuration. In some aspects, the location configuration may be transmitted via RRC signaling or another higher layer protocol. In some aspects, the network node 110 may transmit, and the UE 120 may receive, multiple gap configurations, each indicating a different set of measurement gap characteristics.

In some aspects, as noted above, the NTN measurement gap configuration associates a location configuration with a gap configuration. That is, the NTN measurement gap configuration may indicate a particular set of characteristics for a measurement gap while the UE 120 is at a particular location.

In some aspects, the network node 110 may determine the NTN measurement gap configuration based at least in part on information associated with the UE 120 and TN coverage information.

In some aspects, the information associated with the UE 120 includes route information. The route information is information that indicates a route of the UE 120. In some aspects, the route information may be actual route information (e.g., information that indicates an actual route that the UE 120 will follow). Additionally, or alternatively, the route information may be predicted route information (e.g., information that indicates a predicted route of the UE 120). In some aspects, the UE 120 may provide the route information to the network node 110. Additionally, or alternatively, the network node 110 may determine the route information (e.g., using a route prediction model). Additionally, or alternatively, the information associated with the UE 120 may include a current location of the UE 120 (e.g., an actual location of the UE 120 at the current time as indicated by a set of GPS coordinates). Additionally, or alternatively, the information associated with the UE 120 may include a predicted location of the UE 120 (e.g., a predicted location of the UE 120 at some future time).

The TN coverage information is information that indicates a quality or presence of coverage provided by a TN at a given location (e.g., in a given geographic area). In one example, a network node 110 may obtain TN coverage data based at least in part on measurements reported by many UEs 120 over time (e.g., different days, different months, different years, or the like), with each of these measurements indicating a location of a UE 120, a motion state of the UE 120 (e.g., a heading in GPS coordinates), or an association to a particular cell (e.g., a physical cell identifier), among other examples. The network node 110 may maintain information related to such TN coverage data over time and may generate and maintain a TN coverage model from the TN coverage data.

In some aspects, the network node 110 may determine the NTN measurement gap configuration based at least in part on the information associated with the UE 120 and the TN coverage information. As one example, the network node 110 may generate or have access to TN coverage information in the form of a TN coverage model. Here, the TN coverage model may receive route information associated with a UE 120 and a current or predicted location of the UE 120 as input, and may provide an NTN measurement gap configuration (e.g., a location configuration, a gap configuration, an association of a location configuration and a gap configuration, or the like) as output. In this way, the network node 110 may leverage TN coverage data and adaptively configure a measurement gap for the UE 120 to perform an NTN measurement based at least in part on the route information and the current or predicted location of the UE 120.

As shown at reference 404, the network node 110 may transmit, and the UE 120 may receive, the NTN measurement gap configuration indicating the association of the location configuration with the gap configuration. In some aspects, the network node 110 may transmit, and the UE 120 may receive, the NTN measurement gap configuration and (optionally) the location configuration and/or the gap configuration in a measurement gap configuration information element (IE) (e.g., MeasGapConfig IE).

In some aspects, the network node 110 may transmit, and the UE 120 may receive, one or more items of information associated with the NTN cell for which the measurement is to be performed during the measurement gap (e.g., the NTN cell that is expected to serve the location of the UE 120 at the time at which the UE 120 is expected to be at the location). The information associated with the NTN cell may include, for example, a non-terrestrial network node identifier (e.g., a satellite identifier) associated with the NTN cell, beam information associated with the NTN cell (e.g., a beam identifier), an indication of a frequency associated with the measurement (e.g., a BWP), or an item of information associated with providing NTN access to the UE 120.

As shown at reference 406, the UE 120 may selectively perform a measurement of an NTN cell according to the gap configuration based at least in part on a match of a location of the UE to a location indicated by the location configuration.

In some aspects, selectively performing the measurement of the NTN cell includes performing the measurement of the NTN cell. As one example, the UE 120 may be configured such that the UE 120 is to perform a measurement of the NTN cell when a location of the UE 120 matches the location indicated by the location configuration. Here, the UE 120 may determine that the location of the UE 120 matches the location indicated by the location configuration (e.g., that the UE 120 is within a latitude range and a longitude range indicated by the location configuration, that the UE 120 is attached to a TN cell and moving at a heading within a heading deviation threshold indicated by the location configuration, that the UE 120 is within a zone identified in the location configuration). The UE 120 may then perform the measurement of the NTN cell. In some aspects, the UE 120 may perform the measurement of the NTN cell based at least in part on information associated with the NTN cell (e.g., beam information provided by the network node 110), as described above.

In some aspects, selectively performing the measurement of the NTN cell includes refraining from performing a measurement of the NTN cell. As one example, the UE 120 may be configured such that the UE 120 is not to perform a measurement of the NTN cell when a location of the UE 120 matches the location indicated by the location configuration. Here, the UE 120 may determine that the location of the UE 120 matches the location indicated by the location configuration (e.g., that the UE 120 is within a latitude range and a longitude range indicated by the location configuration, that the UE 120 is attached to a TN cell and moving at a heading within a heading deviation threshold indicated by the location configuration, that the UE 120 is within a zone identified in the location configuration). The UE 120 may then refrain from performing the measurement of the NTN cell.

In this way, configuration of a measurement gap for an NTN cell may be based at least in part on a location or heading of the UE 120 and TN coverage information, which enables measurement gap configuration that reduces a number of NTN cell measurements performed by the UE 120. As a result, interruption to both uplink communication and downlink communication of the UE 120 is reduced, thereby improving performance of the UE 120 (e.g., by increasing throughput, by reducing communication latency, or the like).

FIG. 4B is a diagram of an example scenario in which the techniques and apparatuses described herein for measurement gap configuration described herein may be applied. In the example shown in FIG. 4B, a terrestrial network node 110a provides coverage in an area A, a terrestrial network node 110b provides coverage in an area B, a terrestrial network node 110d provides coverage in an area D, and a non-terrestrial network node 110e provides coverage in areas A, B, C, and D. Notably, there is no TN coverage in area C. A route of the UE 120 is indicated by the dashed line.

In this example, the UE 120 is provided TN coverage during a time period that the UE 120 moves through area A and area B and during a time period that the UE 120 moves through area D. However, the UE 120 does not have TN coverage during a time period that the UE 120 moves through area C. Here, a network node 110 (e.g., the terrestrial network node 110a) may determine and transmit to the UE 120 an NTN measurement gap configuration indicating that the UE 120 is to perform a measurement of an NTN cell (e.g., a cell provided by the non-terrestrial network node 110e) only when the UE 120 is at or near area C. That is, the NTN measurement gap configuration may indicate that the UE 120 is to refrain from performing a measurement of an NTN cell while the UE 120 is in a location of adequate TN coverage. As a result, a number of NTN cell measurements performed by the UE 120 is reduced, thereby reducing interruption to uplink communication and downlink communication of the UE 120 and improving performance of the UE 120 (e.g., by increasing throughput, by reducing communication latency, or the like).

Notably, the UE 120 in this example may in some scenarios be a vehicle UE. In another example, the UE 120 may be a UE travelling in a vehicle UE, where a vehicle UE to passenger UE association is known to the network node 110. That is, the techniques and apparatuses described herein may be applicable to vehicle UEs (e.g., for seamless automotive connectivity) or to mobile UEs that are associated with a vehicle UE (e.g., passenger UEs in vehicle).

As indicated above, FIGS. 4A and 4B are provided as examples. Other examples may differ from what is described with respect to FIGS. 4A and 4B.

Figure 5:
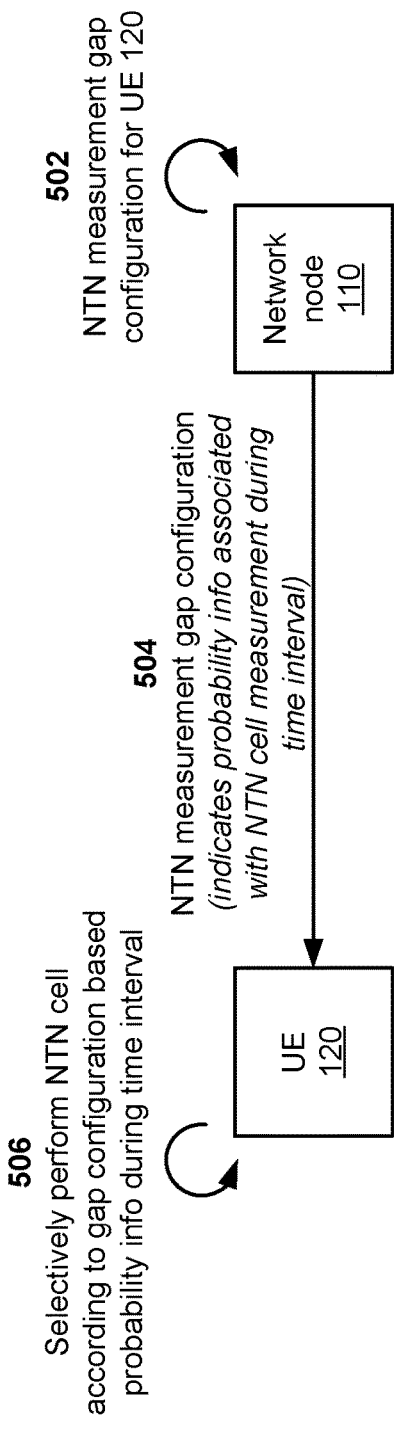
FIG. 5 is a diagram illustrating an example associated with measurement gap configuration of an NTN cell, in accordance with the present disclosure.

FIG. 5 is a diagram illustrating an example 500 associated with measurement gap configuration of an NTN cell, in accordance with the present disclosure. As shown in FIG. 5, the example 500 includes communication between UE 120 and a network node 110 (e.g., a terrestrial network node 110 or a non-terrestrial network node 110). In some aspects, the UE 120 and the network node 110 may be included in a wireless network, such as wireless network 100. The UE 120 and the network node 110 may communicate via a wireless access link, which may include an uplink and a downlink.

As shown at reference 502, the network node 110 may determine an NTN measurement gap configuration for the UE 120. The NTN measurement gap configuration is a configuration based at least in part on which the UE 120 selectively performs a measurement of an NTN cell. In some aspects, the NTN measurement gap configuration indicates probability information associated with measurement of an NTN cell during a time interval.

The probability information is information that indicates a probability for performance of a measurement of an NTN cell. That is, the probability information may indicate a probability that the UE 120 performs a measurement of an NTN cell at a given location. In some aspects, the probability information may be utilized when, for example, TN coverage at a location is neither particularly strong (e.g., at or above an upper threshold) nor particularly weak (e.g., at or below a lower threshold). In some aspects, the probability information provides a precautionary measure for the UE 120 in that the probability information does not entirely prevent the UE 120 from performing measurement of an NTN cell, but still reduces a number of measurements performed by the UE 120 (e.g., so as to reduce a risk of loss of connectivity if the UE 120 loses TN coverage).

In some aspects, the probability information indicates a probability that the UE 120 performs a given NTN measurement. For example, the probability information may indicate a probability of 0.40, meaning that at a given measurement occasion associated with an NTN cell, there is a 40% chance that the UE 120 applies an indicated gap configuration and performs the measurement of the NTN cell. In some aspects, the UE 120 may determine whether to perform a given measurement based at least in part on the probability information. For example, the UE 120 may randomly generate a value between 0.0 and 1.0 and may compare the randomly generated value to a probability indicated by the probability information. Here, if the randomly generated value is greater than the indicated probability, then the UE 120 may refrain from performing the measurement of the NTN cell. Conversely, if the randomly generated value is less than or equal to the indicated probability, then the UE 120 may perform the measurement of the NTN cell. As another example, the probability information may indicate that the UE 120 is to perform a subset of configured NTN cell measurements. For example, the probability information may indicate that the UE 120 is to perform three (randomly selected) measurements of an NTN cell of a next ten configured measurements for the NTN cell.

In some aspects, the probability information is associated with a time interval. For example, the probability information may indicate that the UE 120 is to apply the probability information in association with determining whether to perform a measurement of an NTN for a particular time interval (e.g., after which the UE 120 returns to normal operation). As another example, the probability information may indicate that the UE 120 is to apply the probability information in association with determining whether to perform a measurement of an NTN for a next set of measurements (e.g., a next ten configured measurements, after which the UE 120 returns to normal operation). The time interval associated with the probability information may be expressed in, for example, a number of slots, a number of frames, absolute time, or the like.

In some aspects, the network node 110 may determine the NTN measurement gap configuration based at least in part on TN coverage information. That is, the network node 110 may in some aspects determine the probability information based at least in part on TN coverage information.

As described above, the TN coverage information is information that indicates a quality or presence of coverage provided by a TN at a given location (e.g., in a given geographic area). The network node 110 may maintain information related to such TN coverage data over time and may generate and maintain a TN coverage model from the TN coverage data. In some aspects, the network node 110 may determine the NTN measurement gap configuration based at least in part on the TN coverage information. As one example, the network node 110 may generate or have access to TN coverage information in the form of a TN coverage model. Here, the TN coverage model may indicate an NTN measurement gap configuration (e.g., probability information) for a given location (e.g., a particular geographic area). In this way, the network node 110 may leverage TN coverage data and adaptively configure a measurement gap for the UE 120 to perform an NTN measurement.

As shown at reference 504, the network node 110 may transmit, and the UE 120 may receive, the NTN measurement gap configuration indicating the probability information. In some aspects, the network node 110 may transmit, and the UE 120 may receive, the NTN measurement gap configuration including the probability information and (optionally) a gap configuration in a measurement gap configuration information element (IE) (e.g., MeasGapConfig IE).

In some aspects, the network node 110 may transmit, and the UE 120 may receive, one or more items of information associated with the NTN cell for which the measurement is to be performed during the measurement gap. The information associated with the NTN cell may include, for example, a non-terrestrial network node identifier (e.g., a satellite identifier) associated with the NTN cell, beam information associated with the NTN cell (e.g., a beam identifier), an indication of a frequency associated with the measurement (e.g., a BWP), or an item of information associated with providing NTN access to the UE 120.

As shown at reference 506, the UE 120 may selectively perform a measurement of an NTN cell according to a gap configuration based at least in part on the probability information during the time interval.

In some aspects, selectively performing the measurement of the NTN cell includes performing the measurement of the NTN cell. For example, the probability information may indicate a probability of 0.60, meaning that at a given measurement occasion associated with an NTN cell, there is a 60% chance that the UE 120 applies an indicated gap configuration and performs the measurement of the NTN cell. Here, the UE 120 may randomly generate a value between 0.0 and 1.0 and may compare the randomly generated value to a probability indicated by the probability information. In one example, if the randomly generated value is less than or equal to the indicated probability, then the UE 120 performs the measurement of the NTN cell based at least in part on the indicated gap configuration.

In some aspects, selectively performing the measurement of the NTN cell includes refraining from performing a measurement of the NTN cell. For example, the probability information may indicate a probability of 0.60, meaning that at a given measurement occasion associated with an NTN cell, there is a 60% chance that the UE 120 applies an indicated gap configuration and performs the measurement of the NTN cell. Here, the UE 120 may randomly generate a value between 0.0 and 1.0 and may compare the randomly generated value to a probability indicated by the probability information. In one example, if the randomly generated value is greater than the indicated probability, then the UE 120 refrains from performing the measurement of the NTN cell.

In this way, configuration of a measurement gap for an NTN cell may be based at least in part on probability information and TN coverage information, which enables measurement gap configuration that reduces a number of NTN cell measurements performed by the UE 120. As a result, interruption to both uplink communication and downlink communication of the UE 120 is reduced, thereby improving performance of the UE 120 (e.g., by increasing throughput, by reducing communication latency, or the like).

As indicated above, FIG. 5 is provided as an example. Other examples may differ from what is described with respect to FIG. 5.

Figure 6:
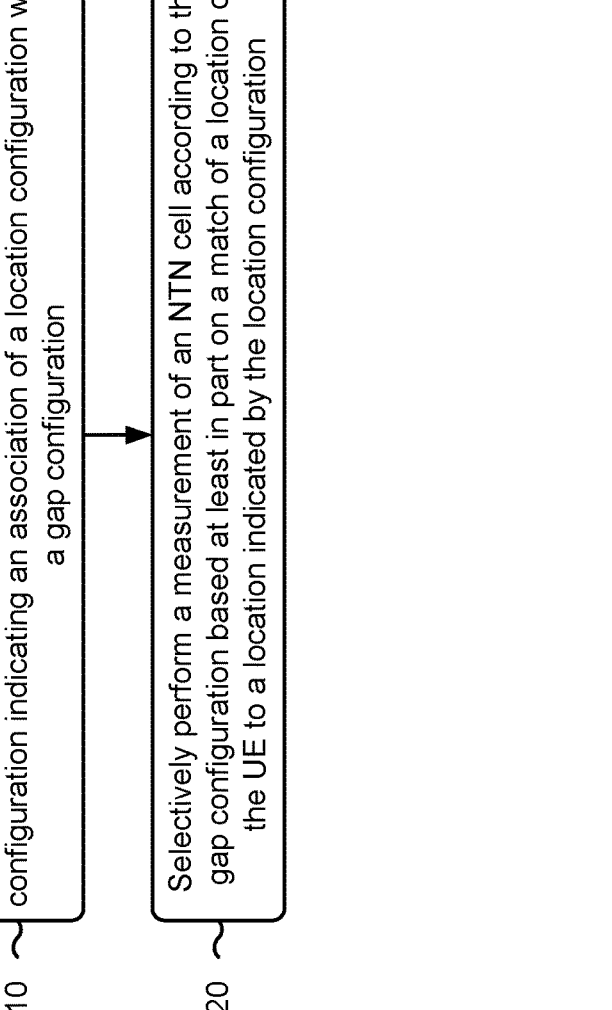
FIG. 6 is a diagram illustrating an example process performed, for example, by a UE, in accordance with the present disclosure.

FIG. 6 is a diagram illustrating an example process 600 performed, for example, by a UE, in accordance with the present disclosure. Example process 600 is an example where the UE (e.g., UE 120) performs operations associated with measurement gap configuration for an NTN cell.

As shown in FIG. 6, in some aspects, process 600 may include receiving an NTN measurement gap configuration indicating an association of a location configuration with a gap configuration (block 610). For example, the UE (e.g., using reception component 1002 and/or communication manager 1006, depicted in FIG. 10) may receive an NTN measurement gap configuration indicating an association of a location configuration with a gap configuration, as described above.

As further shown in FIG. 6, in some aspects, process 600 may include selectively performing a measurement of an NTN cell according to the gap configuration based at least in part on a match of a location of the UE to a location indicated by the location configuration (block 620). For example, the UE (e.g., using communication manager 1006, depicted in FIG. 10) may selectively perform a measurement of an NTN cell according to the gap configuration based at least in part on a match of a location of the UE to a location indicated by the location configuration, as described above.

Process 600 may include additional aspects, such as any single aspect or any combination of aspects described below and/or in connection with one or more other processes described elsewhere herein.

In a first aspect, process 600 includes receiving the location configuration.

In a second aspect, alone or in combination with the first aspect, process 600 includes receiving the gap configuration.

In a third aspect, alone or in combination with one or more of the first and second aspects, the location indicated by the location configuration is indicated by a latitude range and a longitude range included in the location configuration.

In a fourth aspect, alone or in combination with one or more of the first through third aspects, the location indicated by the location configuration is indicated by a TN cell identity, a heading, and a heading deviation threshold included in the location configuration.

In a fifth aspect, alone or in combination with one or more of the first through fourth aspects, the location indicated by the location configuration is indicated by a zone identified in the location configuration.

In a sixth aspect, alone or in combination with one or more of the first through fifth aspects, process 600 includes receiving a zone configuration that defines a geographic area corresponding to the zone.

In a seventh aspect, alone or in combination with one or more of the first through sixth aspects, selectively performing the measurement of the NTN cell comprises performing the measurement of the NTN cell, the measurement of the NTN cell being performed based at least in part on beam information associated with the NTN cell.

In an eighth aspect, alone or in combination with one or more of the first through seventh aspects, process 600 includes receiving the beam information associated with the NTN cell.

In a ninth aspect, alone or in combination with one or more of the first through eighth aspects, selectively performing the measurement of the NTN cell comprises refraining from performing the measurement of the NTN cell.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
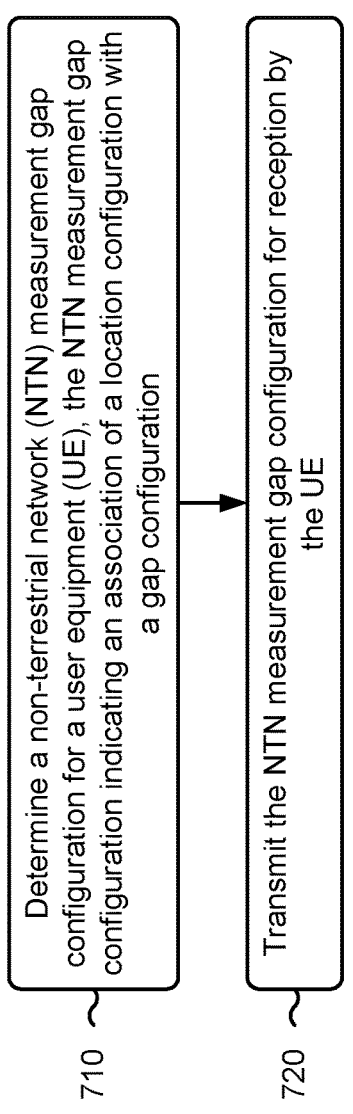
FIG. 7 is a diagram illustrating an example process performed, for example, by a network node, in accordance with the present disclosure.

FIG. 7 is a diagram illustrating an example process 700 performed, for example, by a network node, in accordance with the present disclosure. Example process 700 is an example where the network node (e.g., network node 110) performs operations associated with measurement gap configuration for an NTN cell.

As shown in FIG. 7, in some aspects, process 700 may include determining an NTN measurement gap configuration for a UE, the NTN measurement gap configuration indicating an association of a location configuration with a gap configuration (block 710). For example, the network node (e.g., using communication manager 1106, depicted in FIG. 11) may determine an NTN measurement gap configuration for a UE, the NTN measurement gap configuration indicating an association of a location configuration with a gap configuration, as described above.

As further shown in FIG. 7, in some aspects, process 700 may include transmitting the NTN measurement gap configuration for reception by the UE (block 720). For example, the network node (e.g., using transmission component 1104 and/or communication manager 1106, depicted in FIG. 11) may transmit the NTN measurement gap configuration for reception by the UE, as described above.

Process 700 may include additional aspects, such as any single aspect or any combination of aspects described below and/or in connection with one or more other processes described elsewhere herein.

In a first aspect, the NTN measurement gap configuration is determined based at least in part on route information associated with the UE.

In a second aspect, alone or in combination with the first aspect, the NTN measurement gap configuration is determined based at least in part on at least one of a current location of the UE or a predicted location of the UE.

In a third aspect, alone or in combination with one or more of the first and second aspects, the NTN measurement gap configuration is determined based at least in part on TN coverage information.

In a fourth aspect, alone or in combination with one or more of the first through third aspects, process 700 includes transmitting the location configuration.

In a fifth aspect, alone or in combination with one or more of the first through fourth aspects, process 700 includes transmitting the gap configuration.

In a sixth aspect, alone or in combination with one or more of the first through fifth aspects, the location configuration indicates a latitude range and a longitude range.

In a seventh aspect, alone or in combination with one or more of the first through sixth aspects, the location configuration indicates a TN cell identity, a heading, and a heading deviation threshold.

In an eighth aspect, alone or in combination with one or more of the first through seventh aspects, the location configuration indicates a zone.

In a ninth aspect, alone or in combination with one or more of the first through eighth aspects, process 700 includes transmitting a zone configuration that defines a geographic area corresponding to the zone.

In a tenth aspect, alone or in combination with one or more of the first through ninth aspects, process 700 includes transmitting beam information associated with an NTN cell.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
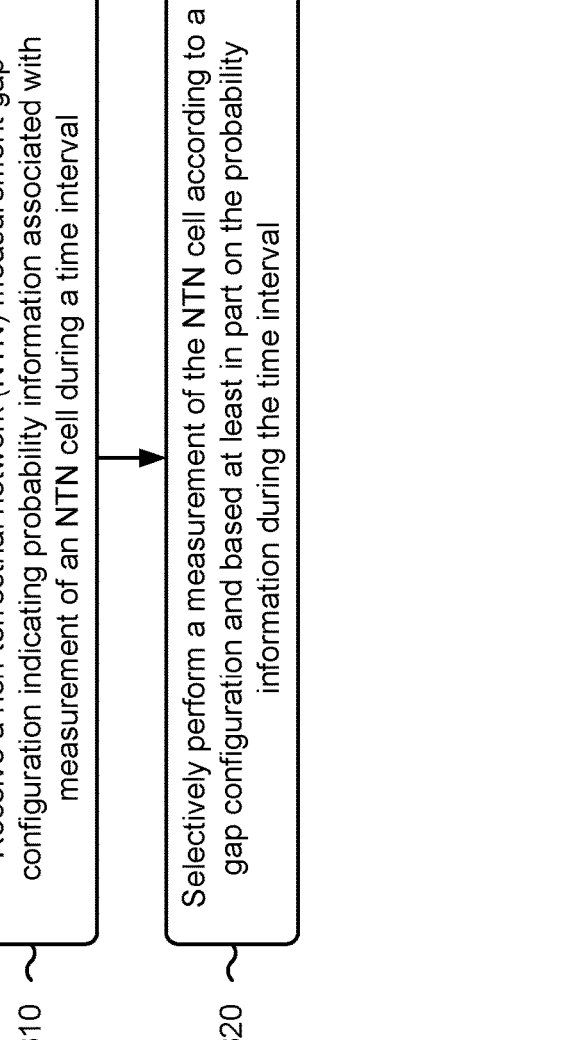
FIG. 8 is a diagram illustrating an example process performed, for example, by a UE, in accordance with the present disclosure.

FIG. 8 is a diagram illustrating an example process 800 performed, for example, by a UE, in accordance with the present disclosure. Example process 800 is an example where the UE (e.g., UE 120) performs operations associated with measurement gap configuration for an NTN cell.

As shown in FIG. 8, in some aspects, process 800 may include receiving an NTN measurement gap configuration indicating probability information associated with measurement of an NTN cell during a time interval (block 810). For example, the UE (e.g., using reception component 1002 and/or communication manager 1006, depicted in FIG. 10) may receive an NTN measurement gap configuration indicating probability information associated with measurement of an NTN cell during a time interval, as described above.

As further shown in FIG. 8, in some aspects, process 800 may include selectively performing a measurement of the NTN cell according to a gap configuration and based at least in part on the probability information during the time interval (block 820). For example, the UE (e.g., using communication manager 1006, depicted in FIG. 10) may selectively perform a measurement of the NTN cell according to a gap configuration and based at least in part on the probability information during the time interval, as described above.

Process 800 may include additional aspects, such as any single aspect or any combination of aspects described below and/or in connection with one or more other processes described elsewhere herein.

In a first aspect, selectively performing the measurement of the NTN cell comprises performing the measurement of the NTN cell, the measurement of the NTN cell being performed based at least in part on beam information associated with the NTN cell.

In a second aspect, alone or in combination with the first aspect, process 800 includes receiving the beam information associated with the NTN cell.

In a third aspect, alone or in combination with one or more of the first and second aspects, selectively performing the measurement of the NTN cell comprises refraining from performing the measurement of the NTN cell.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
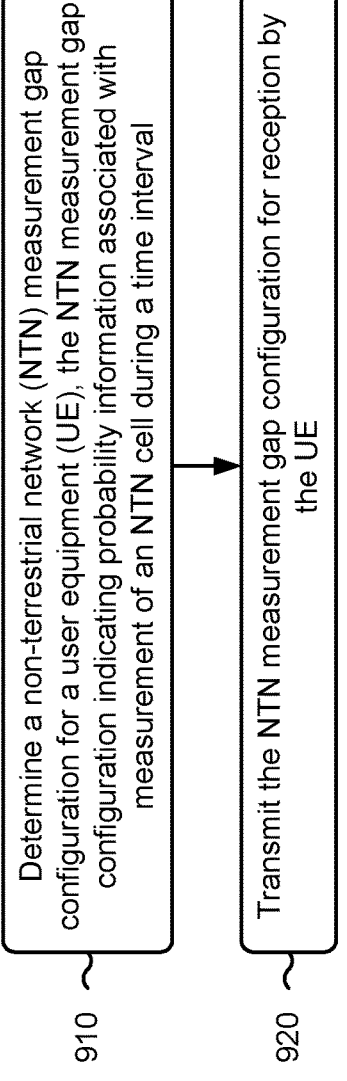
FIG. 9 is a diagram illustrating an example process performed, for example, by a network node, in accordance with the present disclosure.

FIG. 9 is a diagram illustrating an example process 900 performed, for example, by a network node, in accordance with the present disclosure. Example process 900 is an example where the network node (e.g., network node 110) performs operations associated with measurement gap configuration for an NTN cell.

As shown in FIG. 9, in some aspects, process 900 may include determining an NTN measurement gap configuration for a UE, the NTN measurement gap configuration indicating probability information associated with measurement of an NTN cell during a time interval (block 910). For example, the network node (e.g., using communication manager 1106, depicted in FIG. 11) may determine an NTN measurement gap configuration for a UE, the NTN measurement gap configuration indicating probability information associated with measurement of an NTN cell during a time interval, as described above.

As further shown in FIG. 9, in some aspects, process 900 may include transmitting the NTN measurement gap configuration for reception by the UE (block 920). For example, the network node (e.g., using transmission component 1104 and/or communication manager 1106, depicted in FIG. 11) may transmit the NTN measurement gap configuration for reception by the UE, as described above.

Process 900 may include additional aspects, such as any single aspect or any combination of aspects described below and/or in connection with one or more other processes described elsewhere herein.

In a first aspect, the NTN measurement gap configuration is determined based at least in part on TN coverage information.

In a second aspect, alone or in combination with the first aspect, process 900 includes transmitting beam information associated with an NTN cell.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
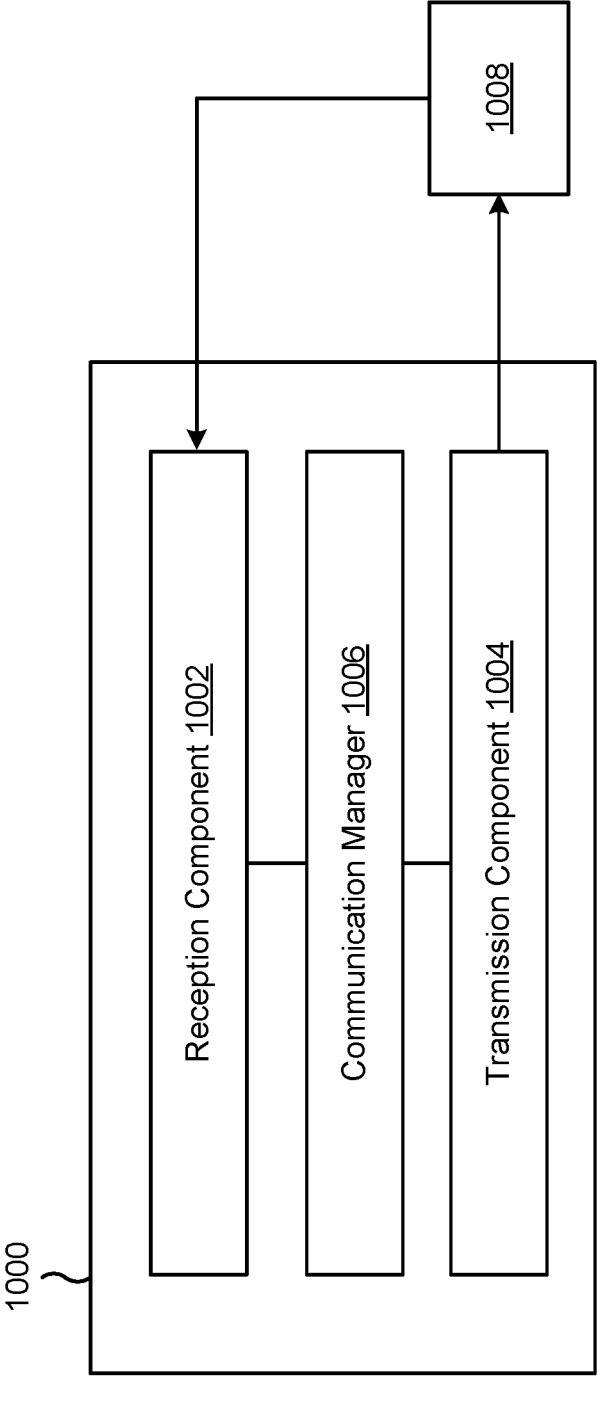
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a UE, or a UE may include the apparatus 1000. In some aspects, the apparatus 1000 includes a reception component 1002, a transmission component 1004, and/or a communication manager 1006, which may be in communication with one another (for example, via one or more buses and/or one or more other components). In some aspects, the communication manager 1006 is the communication manager 140 described in connection with FIG. 1. As shown, the apparatus 1000 may communicate with another apparatus 1008, such as a UE or a network node (such as a CU, a DU, an RU, or a base station), using the reception component 1002 and the transmission component 1004.

In some aspects, the apparatus 1000 may be configured to perform one or more operations described herein in connection with FIGS. 4A-5. Additionally, or alternatively, the apparatus 1000 may be configured to perform one or more processes described herein, such as process 600 of FIG. 6, process 800 of FIG. 8, or a combination thereof. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1008. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1008. In some aspects, one or more other components of the apparatus 1000 may generate communications and may provide the generated communications to the transmission component 1004 for transmission to the apparatus 1008. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1008. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The communication manager 1006 may support operations of the reception component 1002 and/or the transmission component 1004. For example, the communication manager 1006 may receive information associated with configuring reception of communications by the reception component 1002 and/or transmission of communications by the transmission component 1004. Additionally, or alternatively, the communication manager 1006 may generate and/or provide control information to the reception component 1002 and/or the transmission component 1004 to control reception and/or transmission of communications.

The reception component 1002 may receive an NTN measurement gap configuration indicating an association of a location configuration with a gap configuration. The communication manager 1006 may selectively perform a measurement of an NTN cell according to the gap configuration based at least in part on a match of a location of the UE to a location indicated by the location configuration.

The reception component 1002 may receive the location configuration.

The reception component 1002 may receive the gap configuration.

The reception component 1002 may receive a zone configuration that defines a geographic area corresponding to the zone.

The reception component 1002 may receive the beam information associated with the NTN cell.

The reception component 1002 may receive an NTN measurement gap configuration indicating probability information associated with measurement of an NTN cell during a time interval. The communication manager 1006 may selectively perform a measurement of the NTN cell according to a gap configuration and based at least in part on the probability information during the time interval.

The reception component 1002 may receive the beam information associated with the NTN cell.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
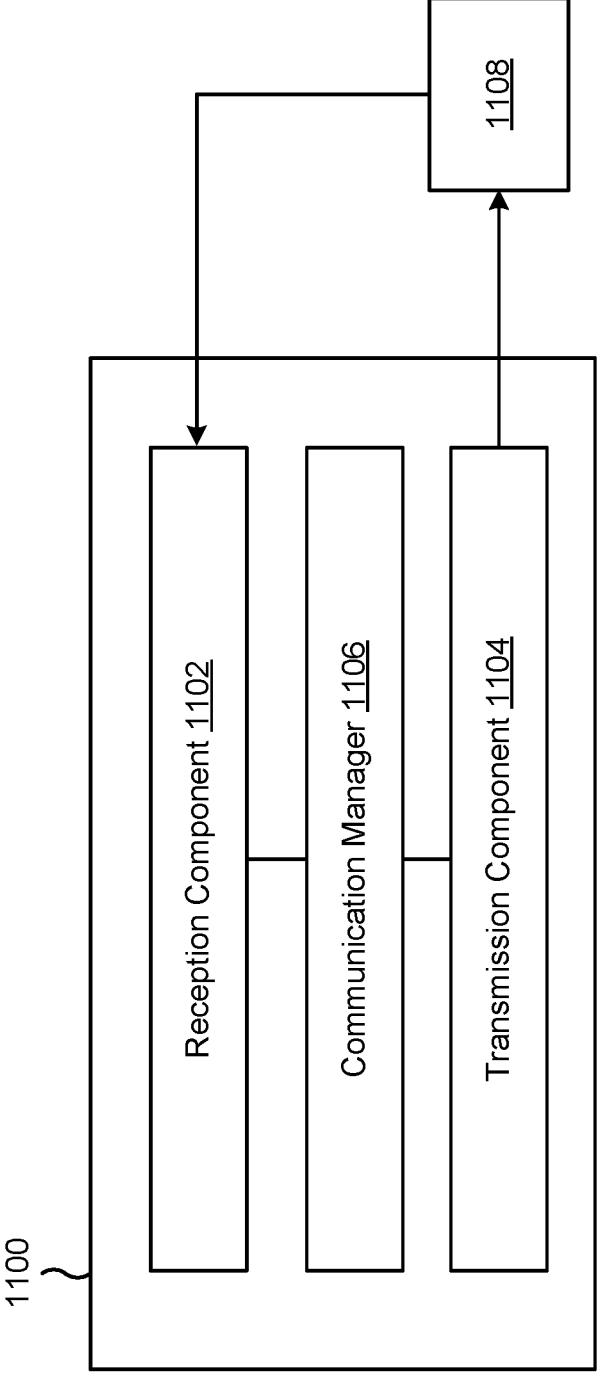
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a network node, or a network node may include the apparatus 1100. In some aspects, the apparatus 1100 includes a reception component 1102, a transmission component 1104, and/or a communication manager 1106, which may be in communication with one another (for example, via one or more buses and/or one or more other components). In some aspects, the communication manager 1106 is the communication manager 150 described in connection with FIG. 1. As shown, the apparatus 1100 may communicate with another apparatus 1108, such as a UE or a network node (such as a CU, a DU, an RU, or a base station), using the reception component 1102 and the transmission component 1104.

In some aspects, the apparatus 1100 may be configured to perform one or more operations described herein in connection with FIGS. 4A-5. Additionally, or alternatively, the apparatus 1100 may be configured to perform one or more processes described herein, such as process 700 of FIG. 7, process 900 of FIG. 9, or a combination thereof. In some aspects, the apparatus 1100 and/or one or more components shown in FIG. 11 may include one or more components of the network node described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1108. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the network node described in connection with FIG. 2. In some aspects, the reception component 1102 and/or the transmission component 1104 may include or may be included in a network interface. The network interface may be configured to obtain and/or output signals for the apparatus 1100 via one or more communications links, such as a backhaul link, a midhaul link, and/or a fronthaul link.

The transmission component 1104 may transmit communications, such as reference signals, control information, data communications, or a combination thereof, to the apparatus 1108. In some aspects, one or more other components of the apparatus 1100 may generate communications and may provide the generated communications to the transmission component 1104 for transmission to the apparatus 1108. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1108. In some aspects, the transmission component 1104 may include one or more antennas, a modem, a modulator, a transmit MIMO processor, a transmit processor, a controller/processor, a memory, or a combination thereof, of the network node described in connection with FIG. 2. In some aspects, the transmission component 1104 may be co-located with the reception component 1102 in a transceiver.

The communication manager 1106 may support operations of the reception component 1102 and/or the transmission component 1104. For example, the communication manager 1106 may receive information associated with configuring reception of communications by the reception component 1102 and/or transmission of communications by the transmission component 1104. Additionally, or alternatively, the communication manager 1106 may generate and/or provide control information to the reception component 1102 and/or the transmission component 1104 to control reception and/or transmission of communications.

The communication manager 1106 may determine an NTN measurement gap configuration for a UE, the NTN measurement gap configuration indicating an association of a location configuration with a gap configuration. The transmission component 1104 may transmit the NTN measurement gap configuration for reception by the UE.

The transmission component 1104 may transmit the location configuration.

The transmission component 1104 may transmit the gap configuration.

The transmission component 1104 may transmit a zone configuration that defines a geographic area corresponding to the zone.

The transmission component 1104 may transmit beam information associated with an NTN cell.

The communication manager 1106 may determine an NTN measurement gap configuration for a UE, the NTN measurement gap configuration indicating probability information associated with measurement of an NTN cell during a time interval. The transmission component 1104 may transmit the NTN measurement gap configuration for reception by the UE.

The transmission component 1104 may transmit beam information associated with an NTN cell.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a UE, comprising: receiving an NTN measurement gap configuration indicating an association of a location configuration with a gap configuration; and selectively performing a measurement of an NTN cell according to the gap configuration based at least in part on a match of a location of the UE to a location indicated by the location configuration.

Aspect 2: The method of Aspect 1, further comprising receiving the location configuration.

Aspect 3: The method of any of Aspects 1-2, further comprising receiving the gap configuration.

Aspect 4: The method of any of Aspects 1-3, wherein the location indicated by the location configuration is indicated by a latitude range and longitude range included in the location configuration.

Aspect 5: The method of any of Aspects 1-4, wherein the location indicated by the location configuration is indicated by a TN cell identity, a heading, and a heading deviation threshold included in the location configuration.

Aspect 6: The method of any of Aspects 1-5, wherein the location indicated by the location configuration is indicated by a zone identified in the location configuration.

Aspect 7: The method of Aspect 6, further comprising receiving a zone configuration that defines a geographic area corresponding to the zone.

Aspect 8: The method of any of Aspects 1-7, wherein selectively performing the measurement of the NTN cell comprises performing the measurement of the NTN cell, the measurement of the NTN cell being performed based at least in part on beam information associated with the NTN cell.

Aspect 9: The method of Aspect 8, further comprising receiving the beam information associated with the NTN cell.

Aspect 10: The method of any of Aspects 1-9, wherein selectively performing the measurement of the NTN cell comprises refraining from performing the measurement of the NTN cell.

Aspect 11: A method of wireless communication performed by a network node, comprising: determining an NTN measurement gap configuration for a UE, the NTN measurement gap configuration indicating an association of a location configuration with a gap configuration; and transmitting the NTN measurement gap configuration for reception by the UE.

Aspect 12: The method of Aspect 11, wherein the NTN measurement gap configuration is determined based at least in part on route information associated with the UE.

Aspect 13: The method of any of Aspects 11-12, wherein the NTN measurement gap configuration is determined based at least in part on at least one of a current location of the UE or a predicted location of the UE.

Aspect 14: The method of any of Aspects 11-13, wherein the NTN measurement gap configuration is determined based at least in part on TN coverage information.

Aspect 15: The method of any of Aspects 11-14, further comprising transmitting the location configuration.

Aspect 16: The method of any of Aspects 11-15, further comprising transmitting the gap configuration.

Aspect 17: The method of any of Aspects 11-16, wherein the location configuration indicates a latitude range and longitude range.

Aspect 18: The method of any of Aspects 11-17, wherein the location configuration indicates a TN cell identity, a heading, and a heading deviation threshold.

Aspect 19: The method of any of Aspects 11-18, wherein the location configuration indicates a zone.

Aspect 20: The method of Aspect 19, further comprising transmitting a zone configuration that defines a geographic area corresponding to the zone.

Aspect 21: The method of any of Aspects 11-20, further comprising transmitting beam information associated with an NTN cell.

Aspect 22: A method of wireless communication performed by a UE, comprising: receiving an NTN measurement gap configuration indicating probability information associated with measurement of an NTN cell during a time interval; and selectively performing a measurement of the NTN cell according to a gap configuration and based at least in part on the probability information during the time interval.

Aspect 23: The method of Aspect 22, wherein selectively performing the measurement of the NTN cell comprises performing the measurement of the NTN cell, the measurement of the NTN cell being performed based at least in part on beam information associated with the NTN cell.

Aspect 24: The method of Aspect 23, further comprising receiving the beam information associated with the NTN cell.

Aspect 25: The method of any of Aspects 22-24, wherein selectively performing the measurement of the NTN cell comprises refraining from performing the measurement of the NTN cell.

Aspect 26: A method of wireless communication performed by a network node, comprising: determining an NTN measurement gap configuration for a UE, the NTN measurement gap configuration indicating probability information associated with measurement of an NTN cell during a time interval; and transmitting the NTN measurement gap configuration for reception by the UE.

Aspect 27: The method of Aspect 26, wherein the NTN measurement gap configuration is determined based at least in part on terrestrial network (TN) coverage information.

Aspect 28: The method of any of Aspects 26-27, further comprising transmitting beam information associated with an NTN cell.

Aspect 29: An apparatus for wireless communication at a device, comprising a processor; memory coupled with the processor; and instructions stored in the memory and executable by the processor to cause the apparatus to perform the method of one or more of Aspects 1-28.

Aspect 30: A device for wireless communication, comprising a memory and one or more processors coupled to the memory, the one or more processors configured to perform the method of one or more of Aspects 1-28.

Aspect 31: An apparatus for wireless communication, comprising at least one means for performing the method of one or more of Aspects 1-28.

Aspect 32: A non-transitory computer-readable medium storing code for wireless communication, the code comprising instructions executable by a processor to perform the method of one or more of Aspects 1-28.

Aspect 33: A non-transitory computer-readable medium storing a set of instructions for wireless communication, the set of instructions comprising one or more instructions that, when executed by one or more processors of a device, cause the device to perform the method of one or more of Aspects 1-28.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:

a memory; and one or more processors, coupled to the memory, configured to:

receive a non-terrestrial network (NTN) measurement gap configuration indicating an association of a location configuration with a gap configuration, wherein the NTN measurement gap configuration is determined based at least in part on a predicted route of the UE; and selectively perform a measurement of an NTN cell according to the gap configuration based at least in part on a match of a location of the UE to a location indicated by the location configuration.

2. The UE of claim 1, wherein the one or more processors are further configured to receive the location configuration.

3. The UE of claim 1, wherein the one or more processors are further configured to receive the gap configuration.

4. The UE of claim 1, wherein the location indicated by the location configuration is indicated by a latitude range and longitude range included in the location configuration.

5. The UE of claim 1, wherein the location indicated by the location configuration is indicated by a terrestrial network (TN) cell identity, a heading, and a heading deviation threshold included in the location configuration.

6. The UE of claim 1, wherein the location indicated by the location configuration is indicated by a zone identified in the location configuration.

7. The UE of claim 6, wherein the one or more processors are further configured to receive a zone configuration that defines a geographic area corresponding to the zone.

8. The UE of claim 1, wherein the one or more processors, to selectively perform the measurement of the NTN cell, are configured to perform the measurement of the NTN cell, the measurement of the NTN cell being performed based at least in part on beam information associated with the NTN cell.

9. The UE of claim 8, wherein the one or more processors are further configured to receive the beam information associated with the NTN cell.

10. The UE of claim 1, wherein the one or more processors, to selectively perform the measurement of the NTN cell, are configured to refrain from performing the measurement of the NTN cell.

11. A network node for wireless communication, comprising:

a memory; and one or more processors, coupled to the memory, configured to:

determine a non-terrestrial network (NTN) measurement gap configuration for a user equipment (UE) based at least in part on a predicted route of the UE, the NTN measurement gap configuration indicating an association of a location configuration with a gap configuration; and transmit the NTN measurement gap configuration for reception by the UE.

12. The network node of claim 11, wherein the NTN measurement gap configuration is determined based at least in part on route information associated with the UE.

13. The network node of claim 11, wherein the NTN measurement gap configuration is determined based at least in part on a current location of the UE.

14. The network node of claim 11, wherein the NTN measurement gap configuration is determined based at least in part on terrestrial network (TN) coverage information.

15. The network node of claim 11, wherein the one or more processors are further configured to transmit the location configuration.

16. The network node of claim 11, wherein the one or more processors are further configured to transmit the gap configuration.

17. The network node of claim 11, wherein the location configuration indicates a latitude range and longitude range.

18. The network node of claim 11, wherein the location configuration indicates a terrestrial network (TN) cell identity, a heading, and a heading deviation threshold.

19. The network node of claim 11, wherein the location configuration indicates a zone.

20. The network node of claim 19, wherein the one or more processors are further configured to transmit a zone configuration that defines a geographic area corresponding to the zone.

21. The network node of claim 11, wherein the one or more processors are further configured to transmit beam information associated with an NTN cell.

22. A user equipment (UE) for wireless communication, comprising:

a memory; and one or more processors, coupled to the memory, configured to:

receive a non-terrestrial network (NTN) measurement gap configuration indicating probability information associated with measurement of an NTN cell during a time interval, wherein the probability information indicates a probability that the UE performs the measurement of the NTN cell at a given location; and selectively perform a measurement of the NTN cell according to a gap configuration and based at least in part on the probability information during the time interval.

23. The UE of claim 22, wherein the one or more processors, to selectively perform the measurement of the NTN cell, are configured to perform the measurement of the NTN cell, the measurement of the NTN cell being performed based at least in part on beam information associated with the NTN cell.

24. The UE of claim 23, wherein the one or more processors are further configured to receive the beam information associated with the NTN cell.

25. The UE of claim 22, wherein the one or more processors, to selectively perform the measurement of the NTN cell, are configured to refrain from performing the measurement of the NTN cell.

26. A network node for wireless communication, comprising:

a memory; and one or more processors, coupled to the memory, configured to:

determine a non-terrestrial network (NTN) measurement gap configuration for a user equipment (UE), the NTN measurement gap configuration indicating probability information associated with measurement of an NTN cell during a time interval, wherein the probability information indicates a probability that the UE performs the measurement of the NTN cell at a given location; and transmit the NTN measurement gap configuration for reception by the UE.

27. The network node of claim 26, wherein the NTN measurement gap configuration is determined based at least in part on terrestrial network (TN) coverage information.

28. The network node of claim 26, wherein the one or more processors are further configured to transmit beam information associated with an NTN cell.

* * * * *